United States Patent [19]
Renfrew et al.

[11] 3,858,259
[45] Jan. 7, 1975

[54] YELLOW METHINE DYES FOR HYDROPHOBIC TEXTILE MATERIAL
[75] Inventors: Edgar Earl Renfrew, Lock Haven, Pa.; Guido Ruggiero Lorenzo Genta, Snyder, N.Y.
[73] Assignee: American Aniline Products, Inc., Lock Haven, Pa.
[22] Filed: Apr. 28, 1972
[21] Appl. No.: 248,483

[52] U.S. Cl. ............................ 8/179, 8/4, 8/54.2, 8/162 B, 8/177 R, 8/178 R, 8/180, 117/138.8 R, 117/138.8 F, 117/138.8 N, 117/138.8 E, 260/465 D, 260/465 E, 260/556 B
[51] Int. Cl. ............................................ D06p 3/52
[58] Field of Search .......... 260/465 D, 465 E; 8/179

[56] References Cited
UNITED STATES PATENTS
3,390,168   6/1968   Brack ................................ 260/465

Primary Examiner—Lewis Gotts
Assistant Examiner—Dolph H. Torrence
Attorney, Agent, or Firm—James E. Armstrong

[57] ABSTRACT

Water insoluble disperse dyes for aromatic polyester textile material are made by the reaction of an aldehyde intermediate derived from an α-(N-alkylanilino)m-toluenesulfonamide, typified by α-(N-ethylanilino)-m-toluenesulfonamide, with a nitrile containing an active methylene group, such as malonoitrile. This class of dyes, when appropriately dispersed, produces bright greenish-yellow dyeings on aromatic polyester fabrics with excellent substantivity, outstanding sublimation fastness, and excellent fastness to light. The dyes are applied to polyesters, such as polyethylene terephthalate, by carrier dyeing, pressure dyeing and thermofixation methods.

6 Claims, No Drawings

YELLOW METHINE DYES FOR HYDROPHOBIC TEXTILE MATERIAL

BACKGROUND OF THE INVENTION

Among the polyester fibers, those based on polyethylene terephthalate continue to be the most important, although fibers based on 1,4-dimethylcyclohexane terephthalate have become commercially available. Developments in both homo- and copolyesters have continued and many modified versions of polyethylene terephthalate have recently appeared on the market. With the advent of new fibers, the search has continued for dyes which build up on the various types of polyester fabric proportionate to the amount of dye applied, and which are characterized by good light and excellent sublimation properties.

In polyethylene terephthalate fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

Styryl dyes for aromatic polyester textile material are known from U.S. Pat. No. 3,635,957 of Guido R. Genta, the copending application of Guido R. Genta, Ser. No. 227,296, filed Feb. 17, 1972, and U.S. Pat. No. 3,349,098 of James M. Straley et al. We have discovered certain new water insoluble styryl dyes provide exceptional results when applied to the now available polyester fibers. These dyes can be applied by any of the standard methods and the resulting dyeings are characterized by good light fastness and outstanding sublimation properties.

SUMMARY OF THE INVENTION

In accordance with the invention, there is provided a dye of the formula:

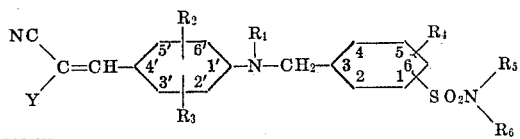

In the above formula, Y is cyano, benzyl, carbamoyl, N-lower alkyl carbamoyl, N,N-dilower alkyl carbamoyl, N-phenyl carbamoyl, N-lower alkoxy, phenylcarbamoyl, N-loweralkyl phenyl carbamoyl, N-halophenyl carbamoyl, lower carbalkoxy, lower carbcyanoalkoxy, phenyl sulfonyl, halophenyl sulfonyl, and lower alkylphenylsulfonyl; $R_1$ is lower alkyl, cyano lower alkyl or hydroxy lower alkyl and $R_2$, $R_3$ and $R_4$ are hydrogen, lower alkyl, lower alkoxy, chlorine or bromine. $R_5$ and $R_6$ are hydrogen, lower alkyl, cyano lower alkyl or hydroxy lower alkyl. Also $R_5$ and $R_6$ when taken collectively form a 5 or 6-membered ring which can include one additional nitrogen or oxygen hetero atom. The term "lower" is used in all cases to designate an alkyl or alkoxy group having up to 6 carbon atoms. The dyes are applied by carrier dyeing, pressure dyeing and thermofixation, using standard methods.

DETAILED DESCRIPTION

Preferred dyes of the invention are those of the formula:

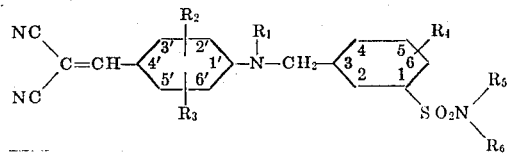

in which $R_1$ = $CH_3$, $C_2H_5$ or $CH_2CH_2CN$; $R_2$ and $R_3$ = H or $CH_3$; $R_4$ = H; and $R_5$ and $R_6$ = H, $CH_3$, $C_2H_5$ or $CH_2CH_2CN$. These and other dyes of the invention are made by the procedures hereinafter described.

Aldehyde intermediates of the type required to make the dyes of the invention are available by a method often referred as the "Vilsmeier-Haack" Reaction (Vilsmeier, A. and A. Haack, Bull. Soc. Chim France 1962 1989). The generalized statement of the reaction is:

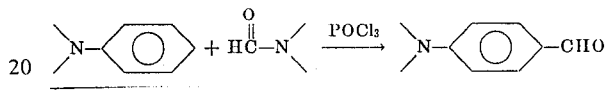

in which a suitable N,N-disubstituted aniline is treated with a suitable formanilide or formamide in the presence of phosphorus oxychloride to yield a p-disubstituted aminobenzaldehyde.

Useful aldehyde intermediates are those of the formula:

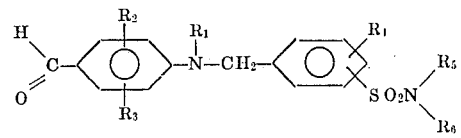

wherein $R_1$, $R_2$, $R_3$, $R_4$, $R_5$ and $R_6$ have the meanings given above.

To make the aldehyde intermediate, dimethyl formamide is placed in a suitable reactor and kept below 25°C, phosphorus oxychloride is added slowly with stirring and the α-(N-alkylanilino)-m-toluenesulfonamide is added thereto, preferably portionwise.

The reaction to form the aldehyde used in the subsequent condensation generally takes from 1–4 hours at a temperature of 80°–120°C, preferably at 90°–95°C. After the reaction is complete the mass is allowed to cool to room temperature, generally over a period of 8–16 hours.

The intermediate is recovered in a conventional manner by drowning the reaction mass in ice water, neutralizing with alkali, separating the organic phase and dissolving it in alcohol, crystallizing, filtering and washing the crystals thus obtained with cold alcohol.

α-(N-alkylanilino)-m-toluenesulfonamides useful in preparing the aldehyde intermediates are made by chlorosulfonation of a suitable tertiary amine, followed by reaction with ammonia, a primary aliphatic amine or a secondary aliphatic amine. Tertiary amine bases which are suitable for the chlorosulfonation reaction are made by the reaction between an N-alkylaniline and a benzyl halide. Particularly useful compounds resulting from this reaction include α-(N-methylanilino)-m-toluenesulfonamide, α-(N-ethylanilino)-m-toluenesulfonamide, α-(N-cyanoethylanilino)-m-toluenesulfonamide, α-(N-methyl-m-toluidino)-m- toluenesulfonamide, α-(N-ethyl-o-chloroanilino)-m-toluenesulfonamide, α-(N-ethylanilino)-m-(6-chlorotoluenesulfonamide), α-(N-methylanilino)-m-(4-methoxytoluenesulfonamide), α-(N-ethylanilino)-m-(N,N-dimethyltoluenesulfonamide), α-(N-cyanoethylanilino)-m-(N-ethyltoluenesulfonamide), α-(N-methylanilino)-m-(N-cyanoethyltoluenesulfonamide), and α-(N-ethylanilino)-m-(N,N-dihydroxyethyltoluenesulfonamide).

The structure of these and other useful compounds are thus:

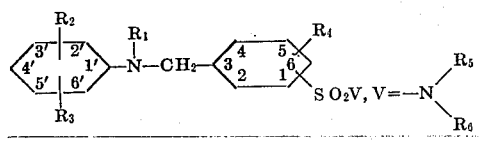

The 4'-position is unsubstituted since it must be available as a reaction site to be useful. The position of the sulfamyl group has been assigned by analogy with the sulfonic acid studies of Blanguy, L, H. E. Fierz-David, G. Stamm, Helv. Chim. Acta. 25 1162 (1942) in which similar N-alkyl-N-arylbenzyl amines were sulfonated, yielding mainly the substituted m-toluenesulfonic acid, V=OH. However, other products were isolated and must represent other positions of the entering sulfo group. Thus, it is highly presumptive that chlorosulfonation behaves similarly, and certain amounts of sulfonamides of the structure are formed. They are useful materials if the sulfonamide group is in the benzyl moiety.

It is possible to synthesize suitable N-alkylanilino-α-p-toluenesulfonamide by treating N-alkylanilines unsubstituted in the para position with α-chloro (or bromo) -p-toluenesulfonamide and their N-substituted and N,N-disubstituted derivatives. The method is not as attractive economically or procedurally as in the chlorosulfonation method. Both series give dyes of the same excellent fastness ratings.

Useful nitriles are those of the formula:

in which Y is as defined aforesaid. Particularly useful are malononitrile; ethyl cyanoacetate; cyanoethyl cyanoacetate, methyl cyanoacetate; cyanoacetamide; N-methyl cyanoacetamide; cyanoacetanilide; cyanocet-o-anisidide; cyanoacet-p-toluidide; cyanoacet-(m-chloro)anilide; phenylsulfonylacetonitrile; p-tolylsulfonylacetonitrile; p-chlorosulfonylacetonitrile.

Along with the nitrile and the aldehyde intermediate, there is charged to the reaction mixture an alcohol, such as ethanol or 2-propanol and a small amount of piperidine to assist in the condensation reaction.

The condensation reaction is run at a temperature of 80–120°C., preferably 100°–105°C. After condensation is complete, which generally requires from about 1½ to 4 hours, the reaction mass is slowly cooled to below room temperature, preferably 10°–15°C. The product dye crystallizes slowly from the reaction mixture at these temperature. The dye is recovered by filtration and is subsequently washed with an alcohol, such as 2-propanol, followed by cold water.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products or sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C (104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in Patterns by conventional printing methods, if desired.

The dye can be also applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°–220°C (356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dye is examined for substantivity of the color, light fastness of the color, and resistance of the color to sublimation. Specific tests for the evaluation of these important properties are described in the examples that follow.

The dyes of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrenebutadiene, are also within the scope of the invention.

Specific examples of thermoplastic resins include polyvinyl chloride, polyvinyl acetate, vinyl chloride-/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate ethylene/ethyl methacrylate, ethylene/allyl alcohol, ethylene/allyl acetate, ethylene/allyl acetone, ethylene-/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylates, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. When the desired product is a semi-rigid material, plasticizers may advantageously be added prior to shaping into the desired final form. As plasticizers suitable for this purpose may be mentioned esters of phthalic acid. Athough the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

Our invention is further illustrated by the following examples:

EXAMPLE 1

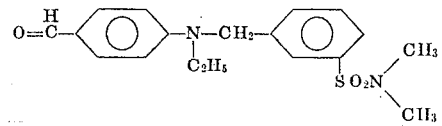

M.W. 346.4

$C_{18}H_{22}N_2O_3S$

To a 500 ml. round bottom four-neck flask equipped with a stirrer, a thermometer, a dropping funnel and a drying tube was charged 100 g. dimethylformamide. To this below 25°C was added dropwise while stirring 58. g. phosphorus oxychloride. The was added in portions 118 g. N,N-dimethyl[α-(N-ethylanilino]-m-toluenesulfonamide. The stirred contents were slowly heated to 90°–95°C, held two hours at that temperature, and then allowed to cool over sixteen hours to room temperature.

To a beaker containing 2,000 ml. water and ice was poured slowly the reaction mass above, the drowning bath never rising above 3°C. Neutralization of the drowned mass was carried out by slowly adding 25 g. sodium hydroxide dissolved in 25 g. water, followed by 45 ml. sodium acetate solution (20% by weight in water). The neutralization was done below 5°C, and Congo Red was used as an indicator. The supernatant liquid was decanted, and the residual viscous oil was dissolved in 250 ml. hot denatured alcohol. Upon spontaneous cooling to room temperature, and further slow cooling to 10°C, yellow crystals separated, which were separated by filtration, washed sparingly with cold alcohol, and dried.

Weight, 105 g.; 80%. Mp 80°–84°C (sinters, 78°C) Calc, N, 8.1%; found 7.8%; Calc, S, 9.2%; found 7.8%.

EXAMPLE 1A

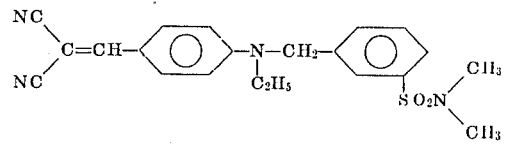

M.W. 394

$C_{21}H_{22}N_4O_2S$

To a 1-liter round bottom four-neck flask equipped with a stirrer, thermometer, reflux condenser and heater was charged 69.2 g. N,N-dimethyl[α(N-ethyl-4-formylanilino)]-m-toluenesulfonamide, 150 g. dimethylformamide, 100 g. 2-propanol, 16.0 g. malononitrile and 5 g. piperidine. The mixture was heated slowly to 105°C, and stirred at the boil under reflux conditions for 2 hours. The heater was then turned off, and the mixture was stirred for 16 hours, during which time the temperature came to that of the surroundings. The heater was removed and replaced with a cooling bath, and the temperature was lowered to 5°C over several hours and the contents allowed to stir for two hours at 5°C. The yellow crystals present were separated on a filter and washed with first 120 ml. 2-propanol, then ca 200 ml. cold water. The product was dried at 80°C. MP. 147°–148°C.

Calc, N, 14.2%; found 14.4%. Calc, S, 8.1; found 7.9%.

To a ball-mill was charged 27.0 g. yellow methine product, 27.0 g. "Lignosol FTA," (a commercially available ligninsulfonic acid dispersing agent) and 126.0 g. water. Milling was carried on until a satisfactory dispersion had been achieved as shown by filter tests.

The dyes of the invention can also be applied from organic solvent solution, for example solutions of perchloroethylene containing 20 to 60% water and, if desired, up to 5% dimethyl sulfoxide.

EXAMPLE 1B

Application of the disperse dye to polyester terephthalate by the established dyeing methods of carrier, pressure and thermofixation yielded brilliant yellow dyeings of outstanding fastness to sublimation, light exposure, and washing as described hereafter. Strength, build-up and staining behavior on hydrophilic fibers was also excellent.

An aqueous dye bath containing 10% Marcron L (a commercially available phenolic dye carrier) and 1% monosodium phosphate as a buffering agent was prepared. Type 54 "Dacron" polyester fabric was treated in a bath at 120°C for 10 minutes, the fabric-to-water dye bath ratio being 1:40. The disperse dye made as described in Example 1A was added in an amount sufficient to provide a bath containing 0.4% dye based on the weight of polyester fibers. Dyeing was continued for one hour at 205°F and the fabric was removed from the bath, rinsed and dried. Sample dyeings were tested for sublimation according to standard AATCC Color Fastness to Dry Heat (sublimation) Test No. 117-1967T, Page 123 of the 1970 Technical Manual of the American Association of Textile Chemists and Colorists. Dyed fabric was placed between a sandwich of undyed Dacron polyester fabric and heat was applied for 30 seconds. Sublimation tests were made at 350°F and 400°F on goods as described above. The dyeing was characterized by bright greenish-yellow hue. Sublimation tests showned substantially no transfer of color, even at 400°F.

Similar excellent results were obtained when the dye was applied to the fabric by pressure and thermofixation methods and then tested for sublimation as described above.

The dyeings were also tested for light fastness by subjecting them to carbon arc fading in accordance with AATCC. Color Fastness to Light, Carbon Arc Lamp, Continuous Light Test No. 16A-1964, as detailed on p. 127, of the 1970 Technical Manual of the AATCC. The dyeings showed substantially no break at 20 hours' exposure, indicating excellent fastness to light.

EXAMPLE 2

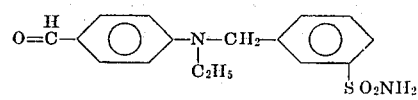

By treating an equivalent amount of α-(N-ethylanilino)-m-toluenesulfonamide as described in Example I, α-(N-ethyl-4-formylanilino)-m-toluenesulfonamide could be prepared in similar yield.

EXAMPLE 2A

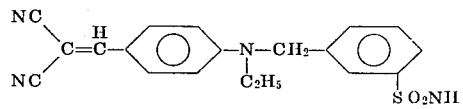

In the manner described in Example 1A, an equivalent amount of α-(N-ethyl-4-formylanilino)-m-toluenesulfonamide could be treated with malononitrile to yield a methine dye of the structure given. After dispersion the structure could be applied to polyester terephthalate fabric by recognized dyeing methods as mentioned in Example 1A. Brilliant greenish-yellow hues were obtained which had the same good durability to degradative agents as did the dyeings of Example 1A.

EXAMPLE 3

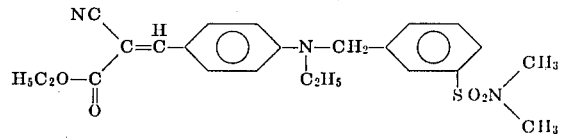

The benzaldehyde whose synthesis is described in Example I was treated with an amount of ethyl cyanoacetate equivalent to the malononitrile and under the same conditions as described in Example 1A. A methine dye of the above structure was obtained. After dispersion it was applied to polyester terephthalate fabric by established methods to yield bright greenish-yellow dyeings of excellent fastness properties. The sublimation fastness was particularly outstanding.

EXAMPLE 4

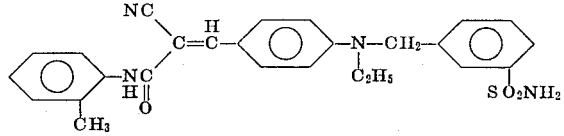

The benzaldehyde whose synthesis is described in Example 2A was treated with cyanoacet-d-toluidide in an amount equivalent to that given for malononitrile in Example 2A, and under the same conditions. A methine dye of the indicated structure was achieved. After dispersion and application to polyester fabric, it yielded brilliant greenish-yellow dyeings of properties comparable to the ones mentioned in Example 1A. The strength of the dye in equal weights was less; the sublimation fastness was somewhat superior.

EXAMPLE 5

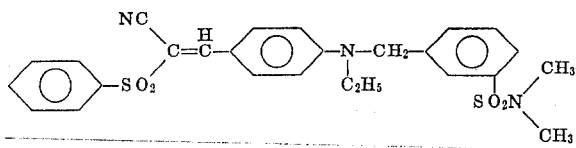

The benzaldehyde of Example I was treated with an amount of cyanomethyl phenyl sulfone equivalent to the malononitrile of Example 1A, and under the same conditions. A methine body of structure as indicated was achieved. After dispersion, it was applied to polyester fabrics to yield brilliant greenish-yellow dyeings of excellent fastness properties, particularly to sublimation.

EXAMPLES 6 – 49

By following the procedures given in the previous examples the following bright greenish-yellow dyes are prepared. The dyes thus prepared when applied to aromatic textile material give excellent light and fastness properties.

TABLE I.—EXAMPLES 6 TO 49

| Example | $R_1$ | $R_2$ | $R_3$ | $R_4$ | $R_5$ | $R_6$ | Y |
|---|---|---|---|---|---|---|---|
| 6 | $CH_3$ | H | 3-$CH_3$ | H | $CH_3$ | H | $SO_2$—⌬ |
| 7 | n-$C_4H_9$ | H | H | H | $CH_2CH_2OH$ | $CH_2CH_2OH$ | $CONH_2$ |
| 8 | $C_2H_5$ | H | 3-$CH_3$ | H | $C_2H_5$ | $C_2H_5$ | CN |
| 9 | $C_2H_5$ | 2-Br | H | H | H | H | CN |
| 10 | $C_2H_5$ | H | H | 4-$CH_3$ | $CH_3$ | $CH_3$ | CN |
| 11 | $C_2H_5$ | 2-$CH_3$ | 5-Cl | H | H | H | CN |
| 12 | $CH_3$ | 2-Cl | H | H | H | H | $CONHCH_3$ |
| 13 | n-$C_3H_7$ | 2-$OCH_3$ | 5-$CH_3$ | H | $CH_3$ | H | CN |
| 14 | $CH_2CH_2OH$ | H | H | H | $CH_2CH_2CN$ | H | CN |
| 15 | $C_2H_5$ | H | H | 4-Cl | H | H | $CONHC_2H_5$ |
| 16 | $CH_3$ | H | H | H | $CH_2CH_2OH$ | H | CONH—⌬ |
| 17 | $C_2H_5$ | H | H | H | $CH_2CH_2OCH_3$ | H | CN |
| 18 | $CH_3$ | 2-$OCH_3$ | 5-$OCH_3$ | H | $CH_3$ | $CH_3$ | CONH—⌬-$OCH_3$ |
| 19 | $C_2H_5$ | H | H | 4-Br | $C_2H_5$ | H | CN |
| 20 | $C_2H_5$ | H | 3-Br | H | $CH_3$ | $CH_3$ | COHN—⌬—Cl |
| 21 | $CH_2CH_2CN$ | H | H | H | $CH_3$ | $CH_3$ | $SO_2$—⌬—$CH_3$ |
| 22 | $C_2H_5$ | 2-$OCH_3$ | H | H | H | H | CN |
| 23 | $C_2H_5$ | 2-Cl | 5-Cl | H | $CH_3$ | H | $COOCH_3$ |
| 24 | $C_2H_5$ | H | H | 4-$OCH_3$ | $C_2H_5$ | $CH_3$ | $COOCH_3$ |
| 25 | $CH_3$ | H | H | H | $CH_3$ | $CH_3$ | CN |
| 26 | $CH_2CH_2CN$ | H | H | H | H | H | CN |
| 27 | $C_2H_5$ | H | H | H | $CH_2CH_2CN$ | $CH_2CH_2CN$ | COHN—⌬ |
| 28 | $C_2H_5$ | H | H | H | $CH_3$ | H | CON⌬ |
| 29 | $C_2H_5$ | H | H | H | $R_5$ and $R_6$ taken together ⌬O | | CN |
| 30 | $C_2H_5$ | 2-Br | H | H | $CH_3$ | $CH_3$ | $CON(CH_3)_2$ |
| 31 | $C_2H_5$ | H | H | H | $CH_3$ | $CH_3$ | $COOCH_2CH_2OH$ |
| 32 | $C_2H_5$ | 2-$CH_3$ | 5-Cl | H | H | H | $CON(CH_2CH_2CN)_2$ |
| 33 | $C_2H_5$ | H | H | H | $C_4H_9$ | H | $SO_2CH_3$ |
| 34 | $CH_2CH_2OH$ | 2-Cl | H | H | $CH_3$ | $CH_3$ | $CONHCH_2CH_2CN$ |
| 35 | $CH_3$ | H | H | H | $CH_2CH_2CN$ | $CH_2CH_2CN$ | $SO_2C_2H_5$ |
| 36 | $C_2H_5$ | 2-$OCH_3$ | 5-$CH_3$ | H | $CH_3$ | $CH_3$ | $COOCH_2CH_2Cl$ |
| 37 | $C_2H_5$ | 2-$OCH_3$ | 5-$CH_3$ | H | $C_2H_5$ | H | $CON(CH_2CH_2OH)_2$ |
| 38 | $C_2H_5$ | 2-$OCH_3$ | 5-$CH_3$ | H | H | H | $COOCH_2CH_2OCH_3$ |
| 39 | $CH_2CH_2CN$ | H | H | H | $CH_3$ | $CH_3$ | $CONHCH_2CH_2OH$ |
| 40 | $C_2H_5$ | H | H | H | $CH_2CH_2OH$ | $CH_2CH_2OH$ | $COOCH_2CH_2O$—⌬ |
| 41 | $C_2H_5$ | H | H | H | $CH_3$ | $CH_3$ | COO—⌬ |
| 42 | $CH_3$ | 2-Cl | H | H | H | H | $COOCH_2CH_2OC_2H_5$ |
| 43 | $CH_3$ | H | H | H | ⌬—$CH_2$ | H | $CONHCH_2CH_2Cl$ |
| 44 | $CH_2CH_2CN$ | H | H | H | $CH_3$ | $CH_3$ | $COOCH_2CH_2Br$ |
| 45 | $CH_2CH_2CN$ | H | H | H | $CH_2CH_2CN$ | H | $COOCH(CH_3)_2$ |

Table I — Continued

| Example | R₁ | R₂ | R₃ | R₄ | R₅ | R₆ | Y |
|---|---|---|---|---|---|---|---|
| 46 | $C_2H_5$ | 2-OCH₃ | 5-CH₃ | H | H | H |  |
| 47 | $C_2H_5$ | 2-OCH₃ | 5-CH₃ | H | CH₂CH₂CN | H |  |
| 48 | CH₃ | H | H | H | CH₂CH₂CN | H |  |
| 49 | $C_2H_5$ | H | H | H | H | H | 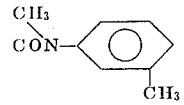 |

EXAMPLE 50

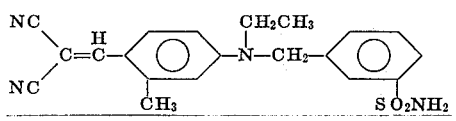

In the manner described in Example 1, an equivalent amount of α-(N-ethyl-m-toluidino)-m-toluenesulfonamide was converted to α[N-ethyl(4-formyl-3-toluidino)]m-toluenesulfonamide. This was treated with malononitrile in the manner described in Example 1A to yield a methine dye of the structure given. Brilliant yellow shades of excellent strength were obtained on polyethylene terephthalate.

EXAMPLE 51

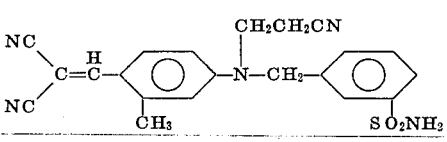

In the manner of Example 50, α[N-3-cyanoethyl(4-formyl-3-toluidino)]m-toluenesulfonamide was treated with malononitrile. Dyeings of the dispersed dye on polyester terephthalate were brilliant yellows of excellent strength, lightfastness and sublimation.

EXAMPLE 52

Methylmethacrylate resin is colored with the compound of Example 1A as the colorant, in a ratio of 2 grams resin to 1 mg. colorant. The resin is prepared by placing 1 pound of methylmethacrylate into a Thropp mill (a 2-roller mill), which is then heated and run in order to melt and smash the resin to a molten mass. The compound of Example 1A is added and the entire mixture of resin and colorant is milled until the colorant is uniformly distributed in the mass as measured by eye. While still hot, 30 grams of the hot mass is cut off for use in the following procedure. The sample, containing 30 grams methylmethacrylate and 15 mg. of the compound of Example IA as colorant, may be conveniently molded in a Laboratory 40 Single Acting Watson-Stillman Laboratory Press (Farrell-Birmingham Co. 50-ton press). 30 grams of methylmethacrylate mixture containing 15 mg. of the compound of Example 1A per pound of methylmethacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, the mold is then closed.

The mold is held closed at zero pressure by releasing the hydraulic pressure and maintaining the steam for 5 minutes. The mold pressure is increased to 10 tons and held for 10 minutes, the steam remaining on.

The mold pressure is increased to 15 tons and the steam shut off; the drain is opened and cooling water is added for 5 minutes. Thereafter the pressure is changed to zero and the mold is opened to extract the resultant plastic chip.

EXAMPLE 53

When the 30 grams of methylmethacrylate are replaced by 2 pounds polystyrene and 10.44 grams titanium dioxide, the procedure of Example 52 being otherwise followed, a fast coloration of the polystyrene is obtained.

EXAMPLE 54

The compounds of the invention may also be used as colorants for plastics made from polycarbonates. A pigmented plastic material of polycarbonates and the compound of Example 1A may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions. 454 gms. Lexan 121-R (General Electric) pellets are placed in Bipel one ounce reciprocating screw injection molder. The pellets are tumbled for five minutes on the barrel tumbler. The resin is heated (front zone temperature of 550°F and rear zone temperature of 500°F) and chips are produced from the virgin resin until chips of good quality are obtained. When the desired quality of chips are obtained with the clear resin, a fresh batch of Lexan 121-R, containing the compound of Example 1A in an equivalent amount corresponding to Example 52 to produce a pigmented plastic material is fed into the injection molder, to produce pigmented chips having excellent fastness characteristics.

EXAMPLE 55

When the compounds of Examples 2A-49 are substituted for the compound of Example 1A in the process of Example 52, methylmethacrylate is colored to produce a greenish-yellow shaped plastic material. The compounds of Examples 2A-49 may be used to impart coloration to polystyrene following the procedure of Example 53, and polycarbonate is pigmented with the compounds of Examples 2A-49 following the procedure of Example 54.

We claim:

1. A polyester textile material dyed with a compound of the formula:

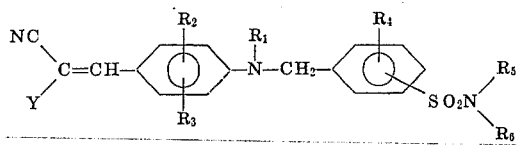

wherein Y is a member selected from the group consisting of cyano, benzyl, carbamoyl, N-lower alkyl carbamoyl, N,N-dilower alkyl carbamoyl, N-phenyl carbamoyl, N-loweralkoxy phenylcarbamoyl, N-loweralkyl phenyl carbamoyl, N-halophenyl carbamoyl, lower carbalkoxy, lower cyanocarbalkoxy, phenyl sulfonyl, halophenyl sulfonyl, and lower alkylphenylsulfonyl; $R_1$ is a member selected from the group consisting of lower alkyl, hydroxy lower alkyl and cyano lower alkyl; $R_2$, $R_3$ and $R_4$ are members selected from the group consisting of hydrogen, lower alkyl, lower alkoxy, chlorine and bromine, and $R_5$ and $R_6$ are members selected from the group consisting of hydrogen, lower alkyl, cyano lower alkyl and hydroxy lower alkyl.

2. The polyester of claim 1 wherein Y is cyano, $R_2$, $R_3$, $R_4$, $R_5$ and $R_6$ are hydrogen; and $R_1$ is ethyl.

3. The polyester of claim 1 wherein Y is cyano, $R_2$, $R_3$ and $R_4$ are hydrogen; $R_5$ and $R_6$ are methyl; and $R_1$ is ethyl.

4. The polyester of claim 1 wherein Y is N-tolylcarbamoyl; $R_2$, $R_3$, $R_4$, $R_5$ and $R_6$ are hydrogen; and $R_1$ is ethyl.

5. The polyester of claim 1 wherein Y is carbethoxy; $R_2$, $R_3$ and $R_4$ are hydrogen; $R_5$ and $R_6$ are methyl; and $R_1$ is ethyl.

6. The polyester of claim 1 wherein Y is phenylsulfonyl, $R_2$, $R_3$ and $R_4$ are hydrogen; $R_5$ and $R_6$ are methyl; and $R_1$ is ethyl.

* * * * *